Jan. 4, 1944. J. VOTYPKA 2,338,309
VEHICLE BODY
Filed May 3, 1939 5 Sheets-Sheet 1
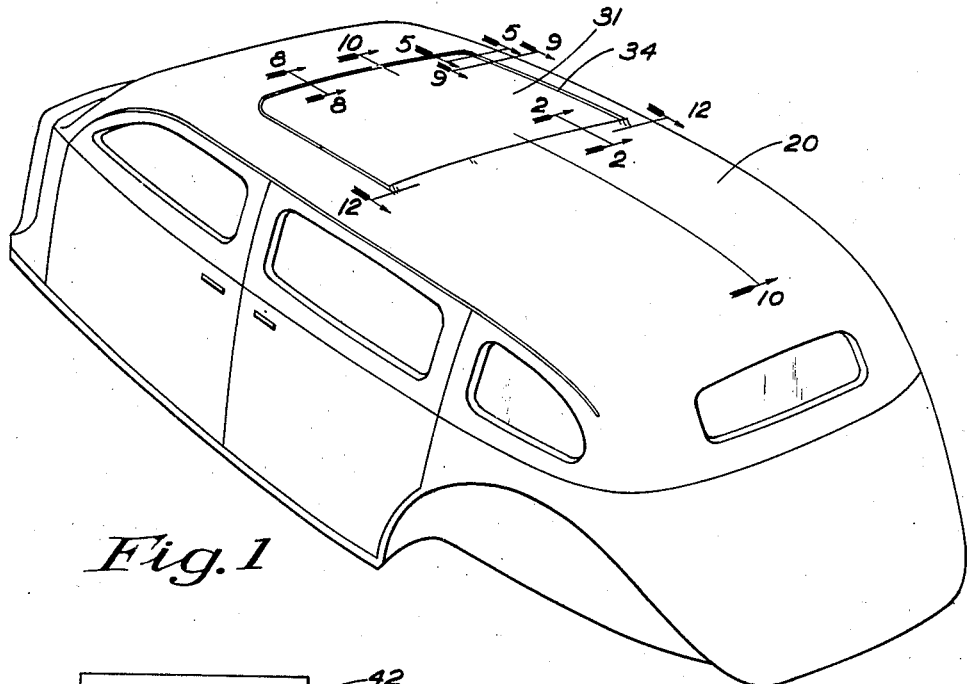
Fig. 1
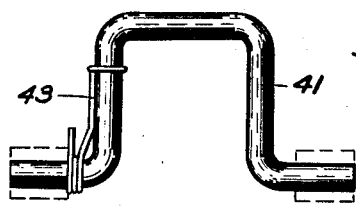
Fig. 3
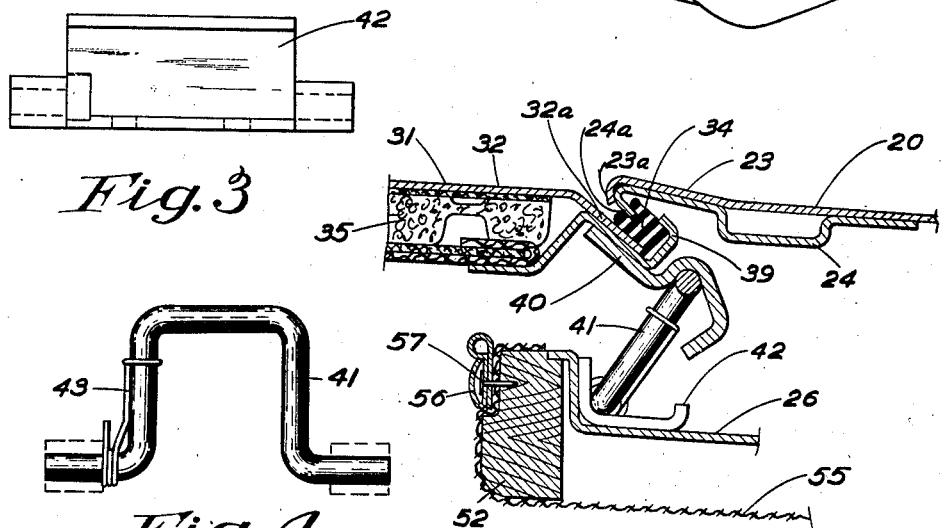
Fig. 4
Fig. 2
INVENTOR.
John Votypka
BY Dike, Calver & Gray
ATTORNEYS.

Jan. 4, 1944.  J. VOTYPKA  2,338,309
VEHICLE BODY
Filed May 3, 1939   5 Sheets-Sheet 2
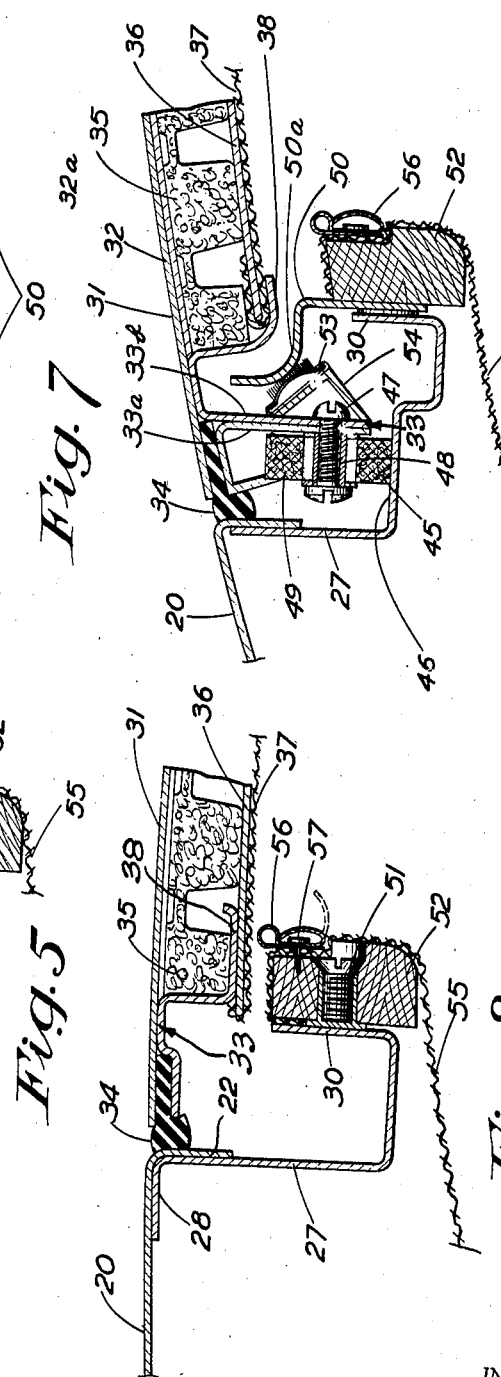
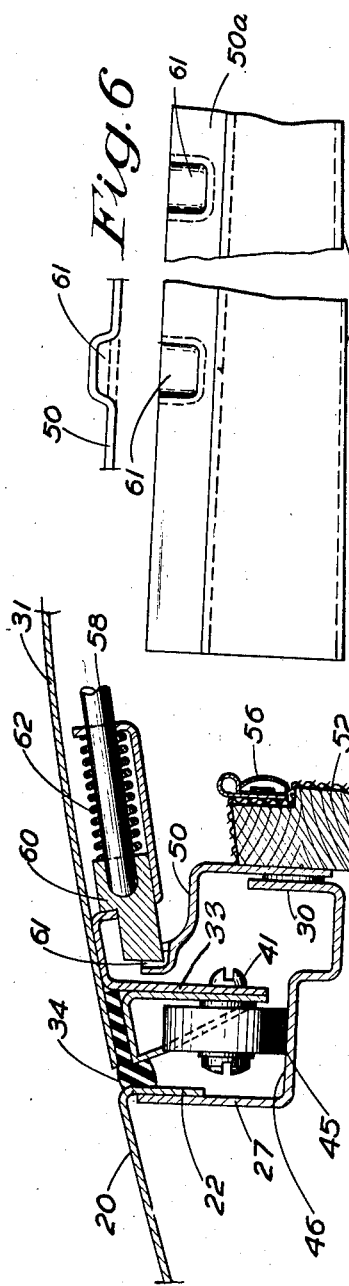
INVENTOR.
John Votypka
BY Dike, Calvert Gray
ATTORNEYS.

Jan. 4, 1944. J. VOTYPKA 2,338,309
VEHICLE BODY
Filed May 3, 1939 5 Sheets-Sheet 3
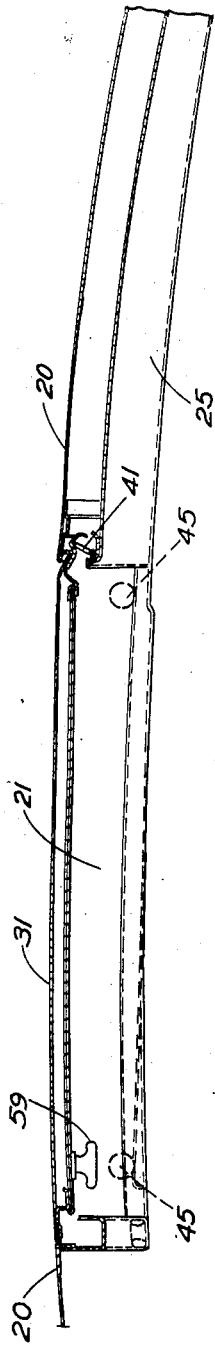
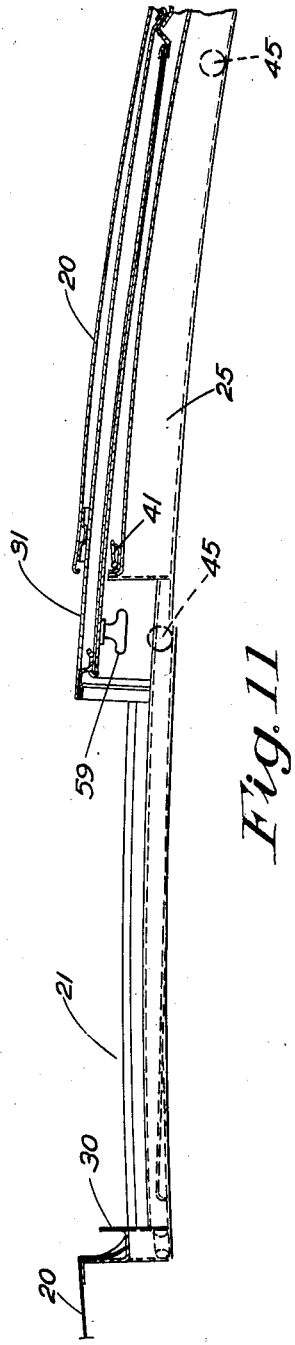
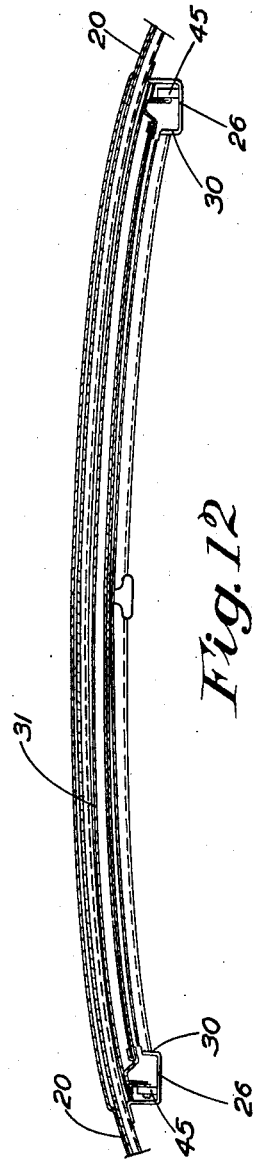
INVENTOR.
John Votypka
BY Dike, Calver & Gray
ATTORNEYS.

Jan. 4, 1944.  J. VOTYPKA  2,338,309
VEHICLE BODY
Filed May 3, 1939  5 Sheets-Sheet 5
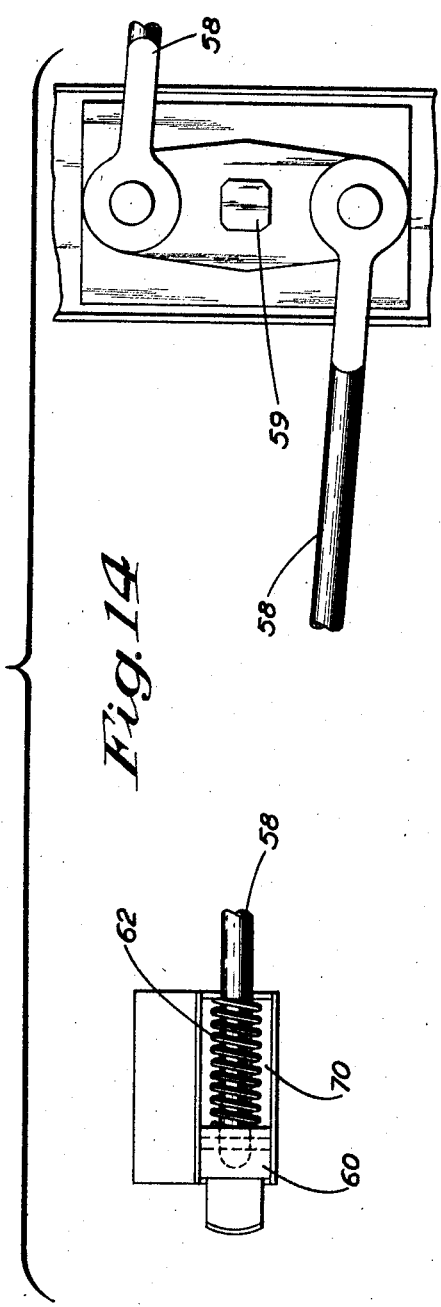
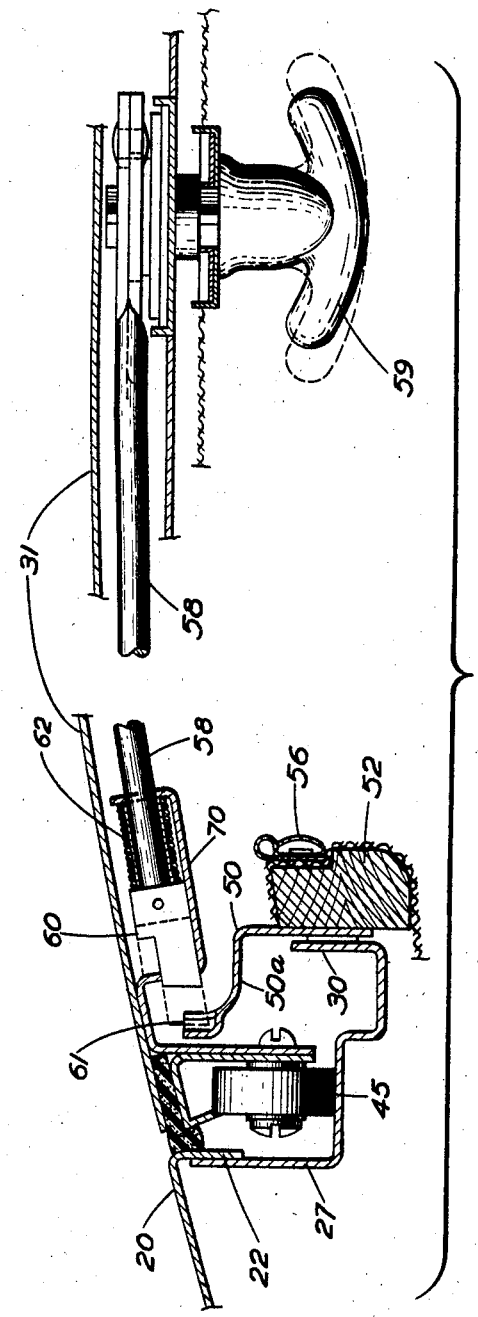
INVENTOR.
John Votypka
BY Dike, Calver & Gray
ATTORNEYS.

Patented Jan. 4, 1944

2,338,309

UNITED STATES PATENT OFFICE 2,338,309

VEHICLE BODY

John Votypka, Detroit, Mich., assignor to Briggs Manufacturing Company, Detroit, Mich., a corporation of Michigan Application May 3, 1939, Serial No. 271,423

5 Claims. (Cl. 296—137)

This invention relates to vehicle bodies and more particularly, although not exclusively, to closed automobile bodies of the type having an opening in the roof thereof controlled by means of a movable roof panel.

One of the objects of the present invention is to provide a closed vehicle body having a roof with an opening therein and a longitudinally movable or adjustable roof panel supported, guided and controlled in an improved manner, whereby it is possible to attain in a closed vehicle body many advantages heretofore attainable only in bodies of the open type.

Another object of the invention is to provide an improved automobile body having a roof curved both longitudinally and transversely of the vehicle, and a movable panel for selectively closing the roof opening, which panel is substantially straight longitudinally of the vehicle, improved means being provided to close the clearance space or opening which is formed between the roof and the movable panel.

A further object of the invention is to provide a vehicle body having a movable roof panel, in which body improved means are provided for positively locking the movable panel in its closed and fully open positions, as well as in a plurality of intermediate positions.

A still further object of the invention is to provide improved means sealing the movable panel in the closed position thereof against draft and water leakage.

A still further object of the invention is to provide a closed motor vehicle body with a skylight aperture and a movable panel for opening and closing the same, in which body improved means are provided effecting noiseless operation of the sliding panel and preventing rattling or chattering of the structure while the vehicle is driven.

A still further object of the invention is to provide an improved vehicle body with a skylight aperture in the roof thereof adapted to be selectively opened and closed by means of a movable panel, said vehicle body having no protruding parts on its roof and presenting, when the movable panel is in its closed position, an appearance of a conventional vehicle body with a smooth top.

It is an added object of the present invention to provide an improved vehicle body of the character specified, which is relatively simple in construction and dependable in operation, and which is relatively cheap to manufacture and service.

Other objects and advantages of this invention will appear in the following description and appended claims, reference being had to the accompanying drawings forming a part of this specification wherein like reference characters designate corresponding parts in the several views.

Fig. 1 is a perspective view of a vehicle body embodying the present invention.

Fig. 2 is a fragmentary sectional view taken in the direction of the arrows on the vertical section plane passing through the line 2—2 of Fig. 1.

Fig. 3 is a plan view illustrating the support of the horseshoe-shaped bracket adapted to raise the trailing edge of the movable panel when the same reaches the end of its stroke.

Fig. 4 is a view showing separately the hinged bracket operating to raise the trailing edge of the movable panel, which hinge is shown in Fig. 2 in section.

Fig. 5 is a fragmentary sectional view taken in the direction of the arrows on the vertical section plane passing through the line 5—5 of Fig. 1.

Fig. 6 is a fragmentary top view of the flange with embossment for engagement of the locking means.

Fig. 7 is a side view of the flange showing the embossments in another view.

Fig. 8 is a fragmentary sectional view taken in the direction of the arrows on the vertical section plane passing through the line 8—8 of Fig. 1 and illustrating the structure at the front end of the movable panel in the closed position thereof.

Fig. 9 is a fragmentary sectional view taken in the direction of the arrows on the vertical section plane passing through the line 9—9 of Fig. 1 and illustrating the means supporting the movable panel and preventing upward movements thereof.

Fig. 10 is a longitudinal sectional view taken in the direction of the arrows on the vertical section plane passing through the line 10—10 of Fig. 1.

Fig. 11 is a view similar in part to Fig. 10, showing the movable panel in the fully opened position thereof.

Fig. 12 is a transverse sectional view taken in the direction of the arrows on the vertical sectional plane passing through the line 12—12 of Fig. 1.

Fig. 14 is a top view of the locking means, the middle portion of the operating rods being broken away.

Fig. 15 illustrates the locking means of Fig. 14 in a side view and in spaced relationship with the top sheet, the sub-sheet and the movable panel.

Figure 13:
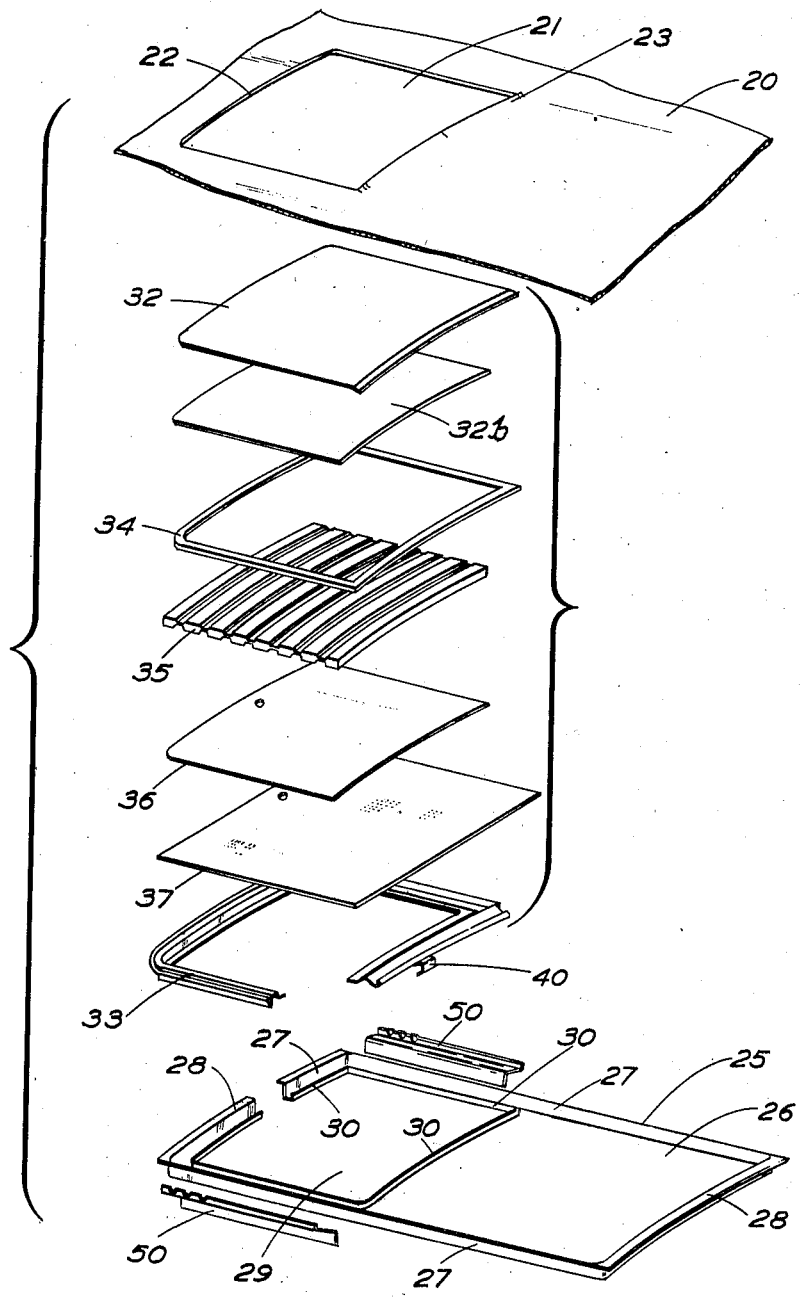
Fig. 13 is an exploded view showing in perspective the top sheet of the roof structure, the sub-sheet and the parts of the movable panel, the parts of the latter being grouped together and indicated with the aid of the smaller bracket.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a vehicle body embodying the present invention. The body shown in the drawings has a skylight aperture in the front part of the roof closed by a panel movable toward the rear of the vehicle to open said aperture. It will be understood, however, that a vehicle body may be constructed in which the skylight aperture is located either in the rear or in some other portion of the roof, and the panel is movable in a different direction than in the structure illustrated in the drawings.

Referring to the drawings, the structure illustrated therein is a motor vehicle body of the four door sedan type, having a top sheet or pressed metal outer roof panel 20 extending continuously from front to rear of the vehicle and extending laterally to the side roof rails. The front part of the top sheet 20 is provided with a skylight aperture 21 of a substantially rectangular shape. Around the front and the sides of said aperture the edges of the top sheet 20 are turned down to form a depending flange 22, while the portion of said top sheet along the rear edge of said aperture is turned slightly upward, as shown at 23, and the very edge of said turned up portion 23 is bent down as shown at 23a, Fig. 2. Along said rear edge of the top sheet 20 there is secured a strip 24 serving as a reinforcement for said edge. Said strip 24 is also provided with a downwardly and rearwardly bent flange 24a fitting into the bend of the turned edge 23a.

Subjacent of said top sheet 20 (see Figs. 12 and 13) there is secured thereto a pan-like sub-sheet 25 having a bottom 26 and continuous marginal upstanding flanges 27 around all four sides thereof to give it pan-like shape. The flanging 27 terminates at the front and rear sides in out-turned flanges 28 which are generally horizontal and contoured to the crown of the roof. As can be clearly seen from Figs. 5, and 8 to 12, the flanging 28 engages the sheet 20 from underneath, while the flanging 22 overlaps the flanging 27 along the three sides of the aperture 21. The top sheet 20 and the sub-sheet 25 are secured together in any suitable manner, such as by spot welding the flanging 28 to the main roof panel or sheet 20. By virtue of such a construction a rigid double wall roof is provided.

In the bottom 26 of the sub-sheet 25 there is provided an opening 29 registering with the skylight aperture 21 but slightly smaller. The metal of the sub-sheet 25 around all four sides of said opening 29 is turned upwardly to provide a continuous upstanding flange 30 which serves to prevent the water which may penetrate through the sealing means and collect in the sub-sheet 25, from dripping into the interior of the body.

In the space formed between the sheets 20 and 25 there is provided a panel movable in said space or pocket to open and to close selectively said skylight aperture 21. In its fully closed position the movable panel, which is indicated generally by the numeral 31, is adapted to be positioned substantially flush with the cover sheet 20, as can be clearly seen in Fig. 10, while in its fully opened position said panel is moved into a pocket formed between the top sheet 20 and the closed portion of the bottom 26 of the sub-sheet 25, as illustrated in Fig. 11.

The movable panel 31 is of a built-up construction in order to provide a panel which is a non-conductor of heat and which dampens the vibrations. As can be best seen in Fig. 13, wherein the parts of the sliding panel with the exception of the locking means are grouped together by the smaller bracket, said panel comprises an upper metal sheet 32 to which is secured, preferably by spot welding, a frame 33. Along the sides and the front part of the panel and pinched between the upper sheet 32 and the frame 33 there is provided a resilient strip 34, preferably of elastic rubber, adapted to be pressed against the flanges 22 as is clearly indicated in Figs. 5, 8 and 9.

Both the aperture 21 and the movable panel 31 are made slightly tapering toward the front of the vehicle. Approximately one quarter of an inch difference between the width of the aperture 21 in front and the rear thereof gives satisfactory results. By virtue of such a construction the forward pressing of the movable panel 31 produces compression of the rubber strip 34 not only in front but also along the sides of the movable panel, thereby ensuring the desired sealing contact of the panel with the cover or top sheet 20. In addition, a slight rearward movement of the movable panel 31 immediately clears the sides of the top sheet 20, reducing the friction and resistance to the rearward movement of the panel 31.

Immediately subjacent the upper sheet 32 of the movable panel 31 there is arranged a sheet of material 32b, such as cardboard, which is followed by a mat 35, preferably of sponge rubber, which serves as heat insulator and sound dampening means. A light, stiff sheet 36, preferably of fiber, covered with fabric 37 of attractive appearance holds said rubber mat 35 in place and is in turn held by the inward flanges 38 of the frame 33, Fig. 9.

Along the rear edge of the movable panel 31 the upper sheet 32 is bent down as indicated at 32a in Fig. 2, and the fourth side of the rectangle formed by the rubber strip 34 overlies said portion 32a, said rear side of the rubber rectangle being held between said portion 32a and the flange 39 of the frame 33.

The flange 39 carries a hook 40 adapted to engage at the end of the forward movement of the panel 31 a bracket 41 hingedly mounted on the bottom 26 of the sub-sheet 25. A support 42 is adapted to prevent the bracket 41 from lying flat on the bottom 26 and thus positioning itself at the dead center of its rotation with respect to the forward movement of the movable panel 31 at which position said bracket 41 would be locked. Said support 42 is shown in Fig. 3 in plan.

By virtue of such a construction the bracket 41 is always held slightly above the bottom 26, and the hook 40 engages the same freely and without locking. Being so engaged by the hook 40, the bracket 41 is rotated as the movable panel continues to move forward, and it raises the rear edge of the panel upwardly until the rubber strip 34 is pressed against the edge of the flange 24a which becomes embedded therein, thus providing a sealing contact along the same. A spring 43 coiled around the bracket 41 is adapted to press it against the support 42 to prevent rattling when the motor vehicle is driven with the movable panel in its open position.

The movable panel 31 carries a plurality, in the present instance four, of rollers 45 adapted to run along parallel tracks 46 formed on the bottom 26 of the sub-sheet 25 along the sides of the opening 29 adjacent the marginal flanging 27. Said tracks 46 are so arranged that in the fully closed position of the movable panel 31 the leading edge of the panel is substantially flush with the top of the sheet 20, and when the trailing edge of said movable panel 31 is raised by the hinged bracket 41, the entire movable panel extends in the skylight aperture 21 substantially flush with the top sheet 20 and it appears to be a continuation of the contour thereof. The only interruption of said continuity appears to the observer as a dark line of the rubber strip 34, as can be seen from an examination of Fig. 1.

The construction of the rollers 45 is illustrated in Figs. 5 and 9. These rollers are mounted by means of an externally threaded screw 47 passing through the flanges 33a and 33b of the movable panel frame 33 and engaging an internally threaded member 48 serving as a bearing for the relatively soft tire 49 which may be formed of felt or other preferably similar non-metallic material. By virtue of such a construction rattling of the rollers on the tracks 46, while the panel is moved or when the motor vehicle is being driven with the movable panel partially opened, is substantially eliminated.

Means are provided to retain the movable panel 31 in place when the same is closed and to prevent it from moving upward. Said means comprise a pair of longitudinal side rails or guide members 50 secured to the side portions of the upstanding flanges 30. In the present embodiment of the invention said members 50 are secured to the flanges 30 (see Fig. 8) by means of a plurality of T-nuts or screw bosses which are suitably secured, such as by spot welding, to said flanges 30 and engage screws 51 which hold a wooden tacking frame 52 to the flanges 30 around all four sides of the opening 29 as well as the members 50 which are interposed between the flanges 30 and the wooden frame 52 along the sides of said opening, as is clearly indicated in Figs. 2, 5, 8 and 9. The members 50 have outwardly extending curved flanges 50a which are engaged from underneath by a strip of lubricated long fiber fabric 53 affixed to a bracket 54 secured to the flange 33b. The length of the fiber as well as the density of the fabric can be varied according to the adjustment necessary for ease of operation and proper alignment. It will now be clear in view of the foregoing that upward movements of the movable panel 31 are yieldingly resisted.

A headlining 55 is wrapped around the wooden frame 52 and is tacked or glued thereto in a way to present an appealing appearance. A finish trim molding or windlace 56 is secured to the wooden frame 52 around all four sides thereof over the headlining 55 with the aid of tacks 57. The front portion of said molding 56 is turned down for tacking, as is indicated in Fig. 8 with the aid of the dotted lines. After the molding 56 is properly tacked, this front portion is turned up and the tacks are entirely concealed. Thus, the gap between the frame 52 and the movable panel 31 in the closed position thereof is substantially closed as shown in Fig. 8.

Means are provided for locking the movable panel in its fully open and closed positions as well as in a plurality of intermediate positions. Said means comprise two metal rods 58 moved selectively inwardly for unlocking and outwardly for locking the panel 31 with the aid of a handle 59. The outer ends of the rods 58 carry locking shoes 60 adapted to engage selectively in a series of corrugations or embossments 61 formed in the upper edges of the flange portions 50a of the guides 50, Figs. 6 and 7. The shoes are slidable inwardly in guide members 63 against the action of springs 62. When the handle 59 is turned in one direction to shift the locking shoes 60 outwardly the same press against the members 50, this engagement of the shoes being maintained with the aid of the springs 62. Each shoe is adapted to slide against and along the member 50 until an indentation or embossment 61 is reached. Thereupon the shoe or latching member 60 is forced into the embossment by the springs 62 and yieldingly held therein. When the handle 59 is turned in the reverse direction to unlock the sliding panel the springs 62 are placed under compression as illustrated in Fig. 15.

It will now be clear in view of the foregoing that the movable panel 51 may be selectively closed or opened either fully or partially thus enabling the attainment of the objects intended. Locking of the movable panel 31 in a plurality of operative positions is positive, and yet operation of this panel is entirely noiseless. In its fully closed position the panel 31 is sealed in the skylight aperture 21 against water leaks and drafts, but should any leakage occur past the sealing strip 34, the drainage is collected on the bottom of sub-sheet 25, the entrance of said drainage through the opening 29 being prevented by the flange 30, and is disposed of in a manner well known in the art, preferably with the aid of a plurality of small tubes or conduits which may be provided in the corners of the sub-sheet 25.

I claim:

1. In a vehicle body, a roof panel having a skylight aperture, a sliding panel movable longitudinally into and out of position to close said opening and having guide devices adjacent opposite side edges thereof, spaced longitudinal guides engaged by said devices for guiding said panel, a swinging bracket hinged to the body beneath said panel, and a depending hook member intermediate said devices at the trailing edge of the panel with the mouth of its bight faced forwardly, said hook member movable automatically into position at the end of the closing movement of the panel to engage said bracket and by continued closing movement to swing the same upwardly whereby a corresponding upward movement is imparted to the trailing edge of the panel to effect sealing engagement thereof with the adjacent edge of said skylight opening.

2. In a vehicle body, a fixed roof panel having a skylight aperture, longitudinal channels secured to said panel along the side edges thereof and disposed below the same, a longitudinally slidable panel adapted to open and close said opening, frame members secured to the bottom of said slidable panel along opposite longitudinal edges thereof, each including a depending flange extending into one of said channels and an inwardly directed flange, insulating material beneath said sliding panel supported by said inwardly directed flanges, guide rollers carried at the outer sides of said depending flanges, and means carried at the inner sides of said depending flanges and cooperating with said channels for resisting vertical displacement of said slidable panel.

3. In a vehicle body, a fixed roof panel having a skylight aperture, longitudinal channels secured to said panel along the side edges thereof and disposed below the same, a longitudinally slidable panel adapted to open and close said opening, frame members secured to the bottom of said slidable panel along opposite longitudinal edges thereof, each including a depending flange extending into one of said channels, guide rollers mounted at the outer sides of said depending flanges for travel along the bottoms of said channels, and means mounted at the inner sides of said depending flanges and cooperable with adjacent overhanging portions of said channels for resisting vertical displacement of said slidable panel.

4. In a vehicle body, a fixed roof panel having a skylight aperture, longitudinal channels secured to said panel along the side edges thereof and disposed below the same, a longitudinally slidable panel adapted to open and close said opening, a longitudinally extending flange member depending from said slidable panel along each side edge thereof and extending downwardly into one of said channels, guide rollers carried by and disposed at the outer sides of said flange members for travel along the bottoms of said channels, and guide devices carried by and disposed at the inner sides of said flange members and cooperable with adjacent overhanging portions of said channels for resisting vertical displacement of said slidable panel.

5. In a vehicle body, a roof panel having a skylight aperture, a sliding panel movable longitudinally into and out of position to close said opening and having guide devices adjacent opposite side edges thereof, spaced longitudinal guides engaged by said devices for guiding said panel, a swinging inverted generally U-shaped bracket hinged to the body beneath said panel, and a depending hook member intermediate said devices at the trailing edge of the panel with the mouth of its bight faced forwardly, said hook member movable automatically into position at the end of the closing movement of the panel to engage said bracket and by continued closing movement to swing the same upwardly whereby a corresponding upward movement is imparted to the trailing edge of the panel to effect sealing engagement thereof with the adjacent edge of said skylight opening.

JOHN VOTYPKA.